No. 110,638.
R. EATON.
REFINING PETROLEUM.
PATENTED JAN. 3, 1871.
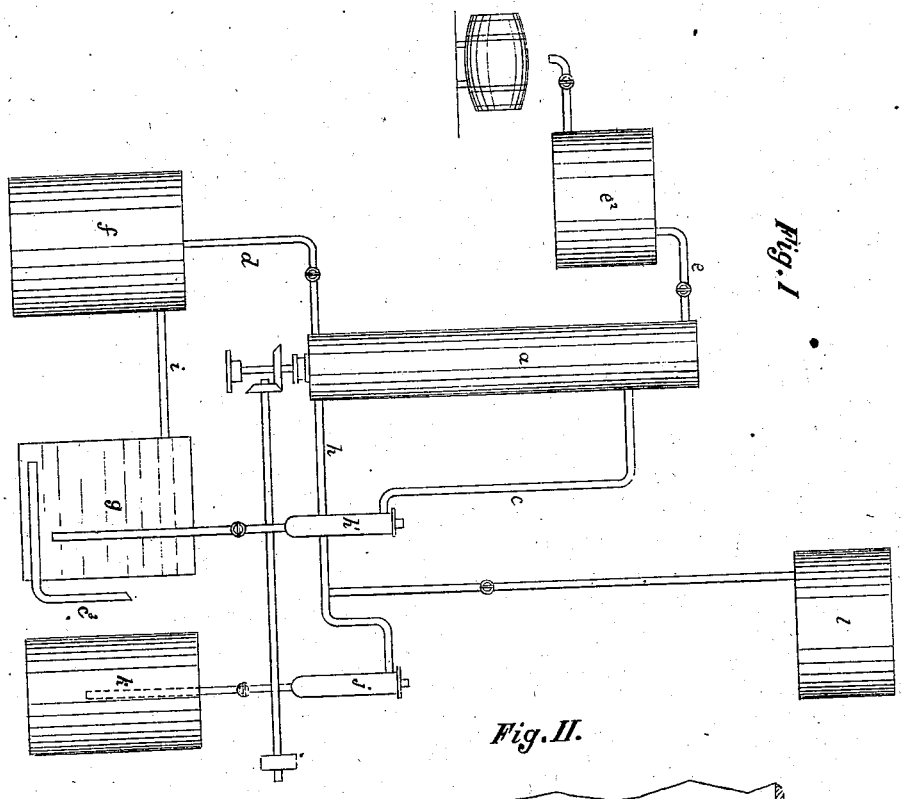
Fig. I.
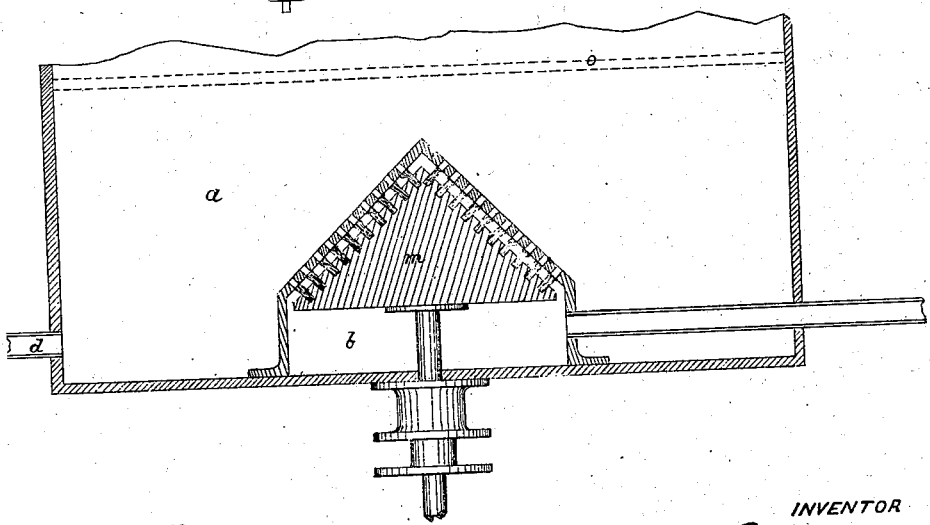
Fig. II.
WITNESSES
INVENTOR

United States Patent Office.

RICHARD EATON, OF MONTREAL, CANADA.

Letters Patent No. 110,638, dated January 3, 1871.

IMPROVEMENT IN REFINING PETROLEUM.

The Schedule referred to in these Letters Patent and making part of the same.

*To all whom it may concern:*

Be it known that I, RICHARD EATON, of the city of Montreal, in the district of Montreal, in the Province of Quebec, Canada, mechanical engineer, have discovered a new and useful "Art of Cleansing or Filtering Crude Petroleum-Oil for lubricating purposes, and apparatus for performing the same;" and I do hereby declare that the following is a full, clear, and exact description of the construction and operation of the same, reference being had to the annexed drawing, where—

Figure I represents a sectional elevation of the apparatus.

Figure II, a detail section.

The object of this discovery is the production of a cheap and at the same time superior lubricating oil for machinery, &c., from the crude petroleum-oils of commerce, by a process which, while performing its functions in removing the gritty and other foreign substance from the crude oils equally well, if not more thoroughly than by the ordinary process employed, does so without impairing or changing the peculiar qualities of the oil, which fit it for lubricating purposes.

This last difficulty has been in a greater or lesser degree experienced in the usual modes adopted for converting the crude petroleum into lubricating oil, the high temperature to which it is exposed, together with the action of the chemicals employed in the process, creating a change in the character of the oil prejudicial to its utility.

In the process I have discovered the *modus operandi* is entirely different. The impurities with gritty substances being washed out of the crude oil mechanically, by bringing the oil in a finely-divided state in contact with hot or cold water, the water having a stronger affinity for the foreign substances than the oil has, unites with and holds them in suspension while passing downward through the oil, and in this manner removes the foreign substances from the vessel in one direction while the oil escapes in another direction into its proper receptacle. The water, charged with its deposit, passes into a suitable reservoir, where the foreign matter is precipitated to the bottom and the purified water passes by an overflow-pipe into a second reservoir, where its temperature is raised by steam or other means to a proper degree, and then passes again, by aid of a pump or otherwise, through a suitable pipe, to a point near the top of the oil-purifying vessel, into which it is discharged, falling down and coming in contact with the ascending oil, which has again been introduced, or other fresh crude oil, into the purifying-vessel, through a pipe leading into its bottom and terminating in a perforated conical nozzle, which causes the oil to enter the vessel in a shower, and thus brings the globules in more immediate contact with the descending water.

A revolving brush, placed on the inner or lower side of the conical nozzle, serves to keep its perforations open or from becoming clogged up with impurities contained in the oil while passing through.

Finely-perforated diaphragms may also be arranged at different points in the purifying-vessel for the oil to pass through, and which will assist in the purifying process. These perforated diaphragms must be so arranged as to be taken out, cleaned, and replaced with facility.

It will be found that two washings will serve for the complete purification of the oil for lubricating purposes, while in some cases one washing will answer.

With the foregoing general description of my discovery, and the manner in which it is carried into operation, I will now proceed to describe more particularly the apparatus employed, identifying each part by a suitable letter of reference.

$a$ is the principal vessel for the purifying process, and may be of any suitable dimensions commensurate with the work to be performed. By preference it is cylindrical in form, and in proportion should possess a length of about six times its diameter.

It is provided on its bottom with a perforated conical chamber, $b$, for the admission of the crude oil in finely-divided streams or globules.

It has also an inlet-pipe, $c$, for the hot water, near its top, and an outlet-pipe, $d$, at the bottom, for the passage of the water from the vessel $a$ after it has performed its functions.

A second outlet-pipe, $e$, is arranged at the upper end for the escape of the oil which has passed upward through the column of water in $a$.

Adjuncts to the purifying-vessel $a$ are the tank $f$, into which the water falls after having passed downward through $a$, and pipe $d$, wherein the the granular or other earthy particles contained in the water are deposited by gravitation on its bottom.

$g$ is a second tank, connected by an overflow-pipe, $i$, to the tank $f$.

Through this pipe the clean water from $f$ passes to $g$, and by means of the pump $h'$ the water is again passed into $a$ through the pipe $c$ $c^2$, the temperature of the water so used having been raised to the proper degree by means of steam introduced into the tank $g$, by a perforated pipe, $c^3$, leading from a boiler.

The crude oil is pressed into the chamber $b$ through the pipe $h$, by means of a force-pump, $j$, supplied from the tank $k$, or the oil may descend from an elevated tank, $l$.

In order to keep the perforations in $b$ clear from deposits of sand or pitchy matter, a revolving brush, $m$, made of wire, or split canes, or other suitable material, is placed on the inside of the cone, and made to revolve by suitable gearing, $n$, connected with the motive-power, water or steam, which operates the pumps.

When the purifed or partially-purified oil reaches the top of the vessel $a$, it passes from thence through the pipe $e$ into the tank $e^2$, from which, if the process is completed, it is drawn off into casks for use.

In the event of requiring additional treatment, it may be returned either to the tank $k$ or $l$ and passed a second time through the purifier $a$, as already described.

All the various supply and discharge-pipes are provided with suitable regulating-cocks.

$o$ are suitable perforated diaphragms, which may be placed at proper intervals in the purifying-vessel $a$ to assist the process and arranged for easy removal at the top of the vessel for cleaning.

Having thus described my discovery, to which I have given the name of "Eaton's art and apparatus for manufacturing lubricating oil from crude petroleum-oils," with the manner in which the same is carried into effect,

What I claim as my discovery is—

1. The art of removing earthy particles and other impurities from crude petroleum-oil by the washing action of water, substantially in the manner and for the purpose described.

2. The entire apparatus in its novel arrangement of purifying-vessel $a$, perforated conical chamber $b$, inlet water-pipes $c$ $c^2$, steam-pipe $c^3$, outlet water-pipe $d$, out oil-pipe $e$, oil-tank $e^2$, water-tanks $f$ and $g$, overflow water-pipe $i$, pumps $h'$ and $j$, oil-supply pipe $h$, and tanks $k$ or $l$, revolving brush $m$, gearing $n$, and perforated diaphragms $o$, all working together, substantially in the manner and for the purpose described.

RICHARD EATON.

Witnesses:
H. CLENDENNING,
CHARLES LEGGE.